United States Patent
Chen

(10) Patent No.: US 9,888,787 B1
(45) Date of Patent: Feb. 13, 2018

(54) HORIZONTAL TYPE ELECTROMAGNETIC CRADLE

(71) Applicant: Way-Hong Chen, Taipei (TW)

(72) Inventor: Way-Hong Chen, Taipei (TW)

(*) Notice: Subject to any disclaimer, the term of this patent is extended or adjusted under 35 U.S.C. 154(b) by 0 days.

(21) Appl. No.: 15/700,255

(22) Filed: Sep. 11, 2017

(51) Int. Cl.
*A47D 9/02* (2006.01)
*H02K 33/10* (2006.01)
*B62B 9/22* (2006.01)

(52) U.S. Cl.
CPC .............. *A47D 9/02* (2013.01); *B62B 9/22* (2013.01); *H02K 33/10* (2013.01)

(58) Field of Classification Search
CPC ....................................................... A47D 9/02
USPC ....................................................... 5/101–109
See application file for complete search history.

(56) References Cited

U.S. PATENT DOCUMENTS

| | | | | |
|---|---|---|---|---|
| 3,261,032 A | * | 7/1966 | Reardon ................. | A47D 9/02 5/108 |
| 2004/0216229 A1 | * | 11/2004 | Xu ........................ | A47D 9/02 5/109 |

* cited by examiner

*Primary Examiner* — Fredrick Conley
(74) *Attorney, Agent, or Firm* — Alan D. Kamrath; Kamrath IP Lawfirm, P.A.

(57) ABSTRACT

An electromagnetic cradle includes a track assembly, a sliding assembly, a rocking bed and a bottom frame. The track assembly includes two tracks, and an electromagnetic device mounted on one of the tracks. Each of the tracks has a first slideway and a second slideway. The sliding assembly includes two linking rods each slidably mounted between the tracks, two slides each mounted on the linking rods, a plurality of magnet sets mounted on one of the slides and aligning with the electromagnetic device, and two elastic members each biased between one of the slides and the electromagnetic device. Each of the linking rods has two first rollers each mounted in the first slideway and two second rollers mounted in the second slideway. The rocking bed is mounted above the slides. The bottom frame is mounted under the tracks.

7 Claims, 8 Drawing Sheets

HORIZONTAL TYPE ELECTROMAGNETIC CRADLE

BACKGROUND OF THE INVENTION

1. Field of the Invention

The present invention relates to a cradle and, more particularly, to an electromagnetic cradle of a horizontal type.

2. Description of the Related Art

A conventional cradle is used for placing a baby to facilitate the watcher caring the baby. However, the conventional cradle is operated by a manual labor, thereby wasting the watcher's energy and time. A conventional motorized cradle is operated by a motor to save the manual labor. However, the motor produces great noise, thereby causing an uncomfortable sensation to the watcher, and thereby affecting the baby's sleeping quality. A conventional electromagnetic cradle comprises multiple swinging arms, multiple links, an electromagnetic mechanism, and a rocking bed. The swinging arms and the links are located under the rocking bed. The electromagnetic mechanism drives the swinging arms and the links to drive the rocking bed to swing reciprocally. However, the swinging arms need a large space to perform the swinging movement, so that the swinging arms and the links increase the whole structural space of the conventional electromagnetic cradle. In addition, the swinging arms easily deflect and vibrate during the swinging action, so that the swinging arms are not operated smoothly and steadily. Further, the conventional electromagnetic cradle has a complicated construction and is not assembled easily and conveniently.

BRIEF SUMMARY OF THE INVENTION

In accordance with the present invention, there is provided an electromagnetic cradle comprising a track assembly, a sliding assembly mounted on the track assembly, a rocking bed mounted on the sliding assembly, and a bottom frame mounted on the track assembly. The track assembly includes two tracks, and at least one electromagnetic device selectively mounted on one of the two tracks. Each of the two tracks has an interior provided with a first slideway and an exterior provided with a second slideway. The sliding assembly includes two linking rods each slidably mounted between the two tracks of the track assembly, two slides each mounted on the two linking rods, a plurality of magnet sets mounted on one of the two slides and aligning with the at least one electromagnetic device, and at least two elastic members each biased between the one of the two slides and the at least one electromagnetic device. Each of the two linking rods has two distal ends each provided with a first roller slidably mounted in the first slideway of one of the two tracks and a second roller slidably mounted in the second slideway of one of the two tracks. The first roller is arranged in a vertical manner. The second roller is arranged in a horizontal manner. Each of the two slides is provided with two support arms each mounted on one of the two linking rods. The rocking bed is mounted on and located above the two slides of the sliding assembly. The bottom frame is mounted on and located under the two tracks of the track assembly.

Preferably, each of the two tracks includes an inner rack and an outer rack combined together, and the first slideway is formed in the inner rack and the outer rack after combination of the inner rack and the outer rack.

Preferably, the bottom frame is mounted on the outer rack.

Preferably, the magnet sets are juxtaposed to each other and are directed in a direction the same as a path of the first slideway and the second slideway, and each of the magnet sets includes two magnets overlapping each other.

Preferably, each of the at least two elastic members is located at an inner side of the one of the two slides and is biased between one of the two support arms and the at least one electromagnetic device.

Preferably, the one of the two slides is located above the at least one electromagnetic device, each of the two support arms extends downward from a bottom of each of the two slides, and each of the two support arms is located above on one of the two linking rods.

Preferably, the bottom frame is provided with a plurality of castors to facilitate movement of the rocking bed.

According to the primary advantage of the present invention, the two tracks of the track assembly are compact and do not occupy a large space, thereby reducing the whole structural space of the electromagnetic cradle.

According to another advantage of the present invention, the first roller and the second roller are arranged in two different angles to restrict and calibrate the sliding angle of the first roller, so that the rocking bed is moved in the horizontal direction smoothly and steadily without producing vibration or sway.

According to a further advantage of the present invention, the rocking bed is moved conveniently by provision of the at least two elastic members.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
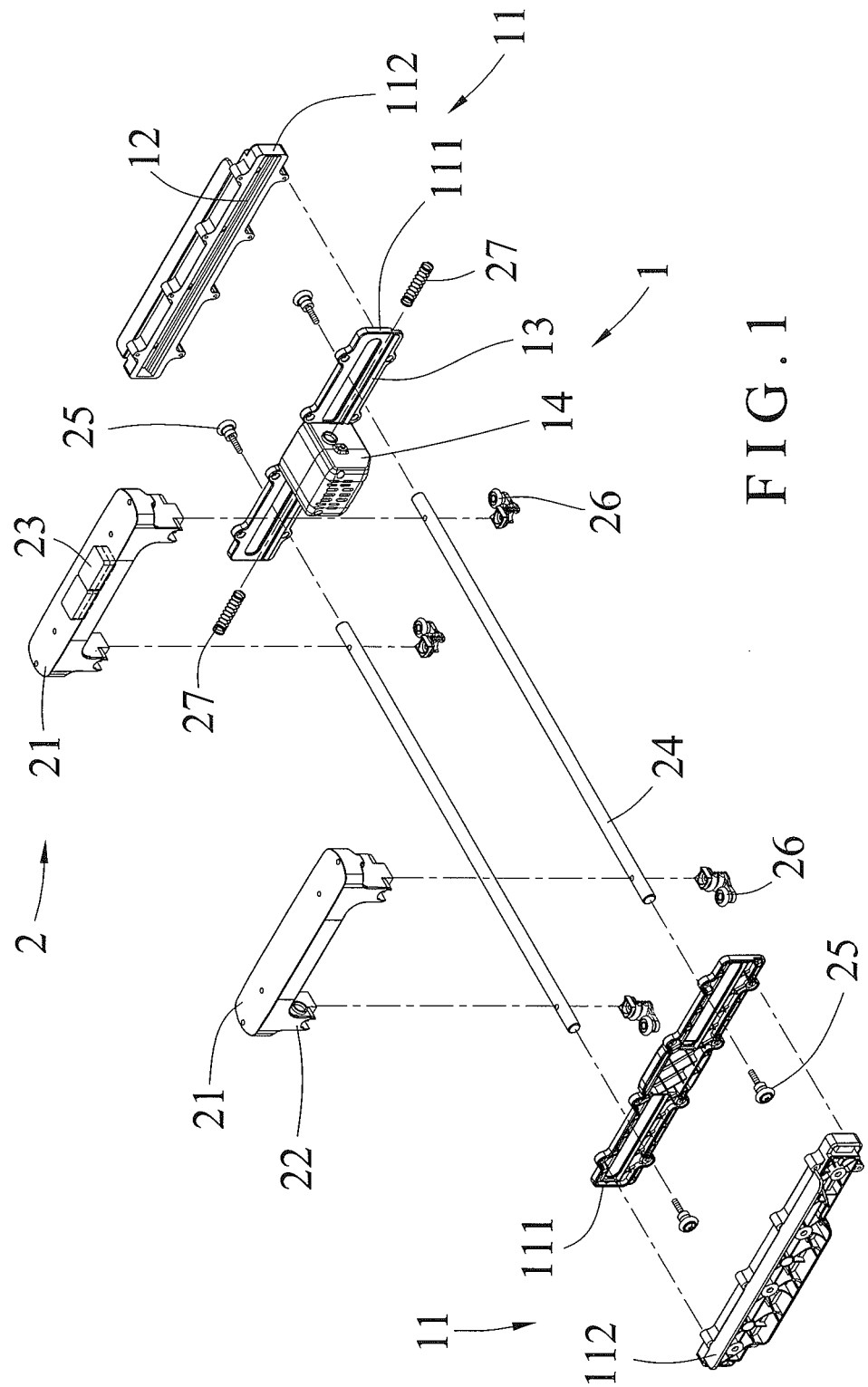
FIG. 1 is a partially exploded perspective view of an electromagnetic cradle in accordance with the preferred embodiment of the present invention.
Figure 2:
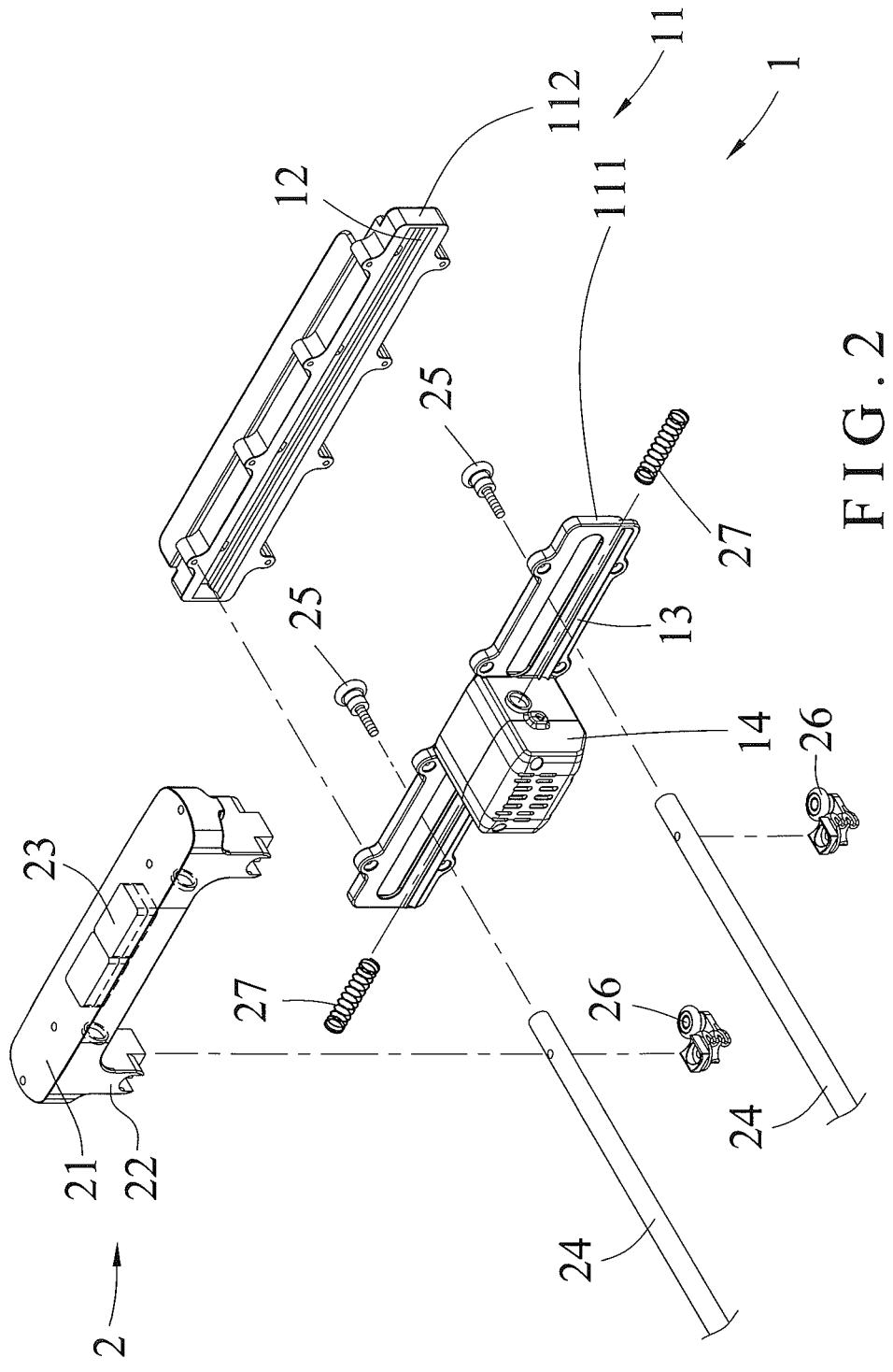
FIG. 2 is a locally enlarged view of the electromagnetic cradle as shown in FIG. 1.
Figure 3:
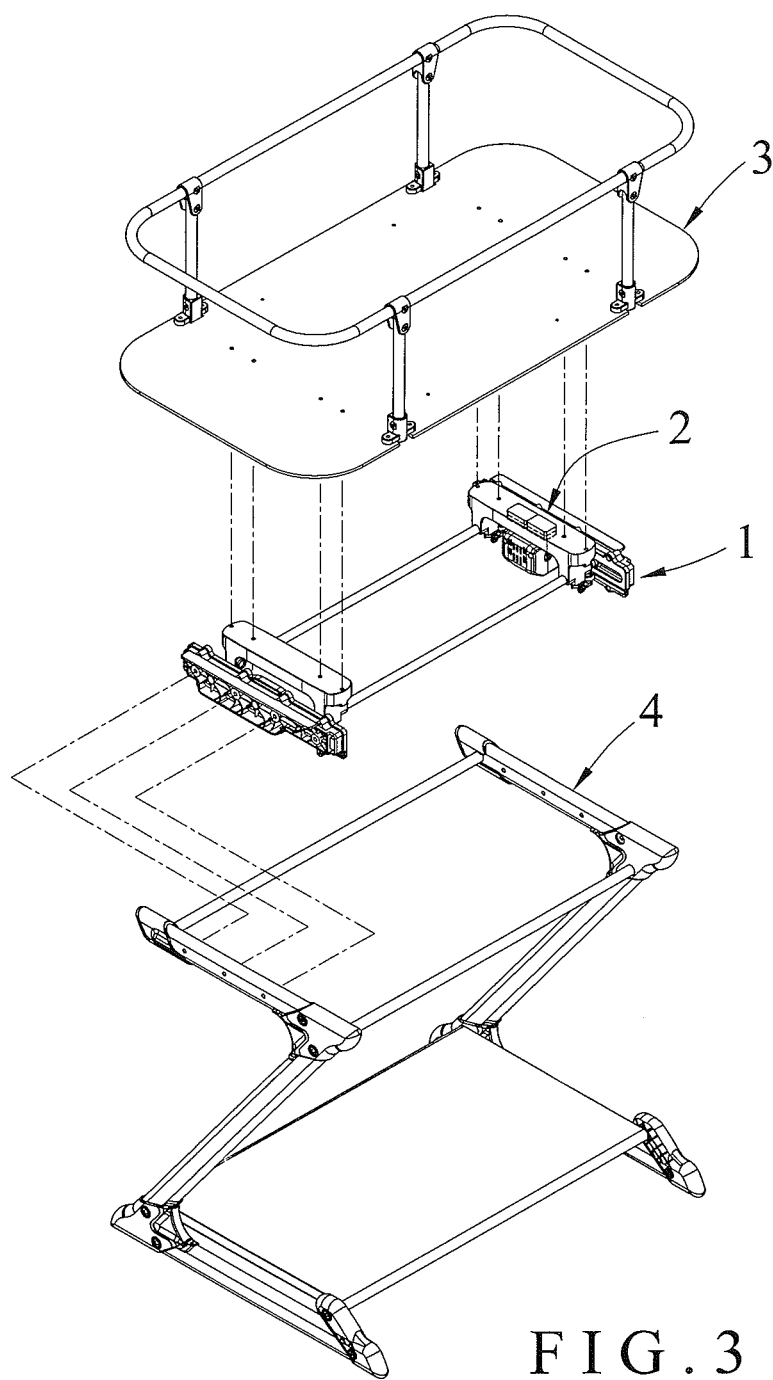
FIG. 3 is an exploded perspective view of the electromagnetic cradle in accordance with the preferred embodiment of the present invention.
Figure 4:
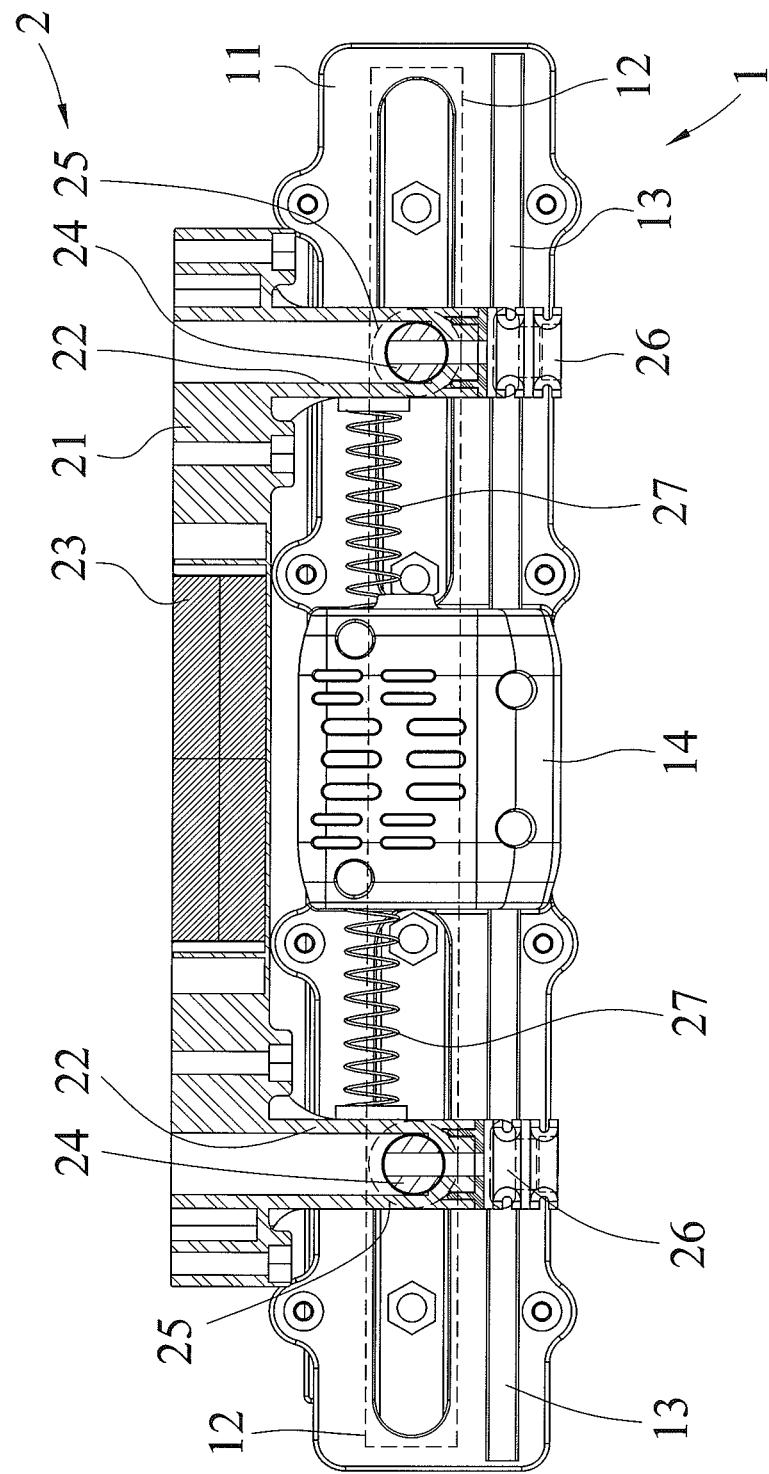
FIG. 4 is a cross-sectional assembly view of the electromagnetic cradle as shown in FIG. 2.

Referring to the drawings and initially to FIGS. 1-7, an electromagnetic cradle in accordance with the preferred embodiment of the present invention comprises a track assembly 1, a sliding assembly 2 mounted on the track assembly 1, a rocking bed 3 mounted on the sliding assembly 2, and a bottom frame 4 mounted on the track assembly 1.

The track assembly 1 includes two tracks 11 arranged symmetrically, and at least one electromagnetic device 14 selectively mounted on one of the two tracks 11. Each of the two tracks 11 has an interior provided with a first slideway 12 and an exterior provided with a second slideway 13.

The sliding assembly 2 includes two linking rods 24 each slidably mounted between the two tracks 11 of the track assembly 1, two slides 21 each mounted on the two linking rods 24, a plurality of magnet sets 23 mounted on one of the two slides 21 and aligning with the at least one electromagnetic device 14, and at least two elastic members 27 each biased between the one of the two slides 21 and the at least one electromagnetic device 14. Each of the two linking rods 24 has two distal ends each provided with a first roller 25 slidably mounted in the first slideway 12 of one of the two tracks 11 and a second roller 26 slidably mounted in the second slideway 13 of one of the two tracks 11. The first roller 25 is arranged in a vertical manner. The second roller 26 is arranged in a horizontal manner. Each of the two slides 21 is provided with two support arms 22 each mounted on one of the two linking rods 24. The one of the two slides 21 is located above the at least one electromagnetic device 14, and each of the two support arms 22 extends downward from a bottom of each of the two slides 21.

The rocking bed 3 is mounted on and located above the two slides 21 of the sliding assembly 2 to bear the baby.

The bottom frame 4 is mounted on and located under the two tracks 11 of the track assembly 1 to support the rocking bed 3.

In the preferred embodiment of the present invention, each of the two tracks 11 includes an inner rack 111 and an outer rack 112 combined together, and the first slideway 12 is formed in the inner rack 111 and the outer rack 112 after combination of the inner rack 111 and the outer rack 112.

In the preferred embodiment of the present invention, the bottom frame 4 is mounted on the outer rack 112.

In the preferred embodiment of the present invention, the magnet sets 23 are juxtaposed to each other and are directed in a direction the same as a path of the first slideway 12 and the second slideway 13 to enhance the magnetic strength of the magnetic field. Preferably, each of the magnet sets 23 includes two magnets overlapping each other. Each of the two magnets has a rectangular shape.

In the preferred embodiment of the present invention, each of the at least two elastic members 27 is located at an inner side of the one of the two slides 21 and is biased between one of the two support arms 22 and the at least one electromagnetic device 14.

In the preferred embodiment of the present invention, each of the two support arms 22 is located above on one of the two linking rods 24.

Figure 5:
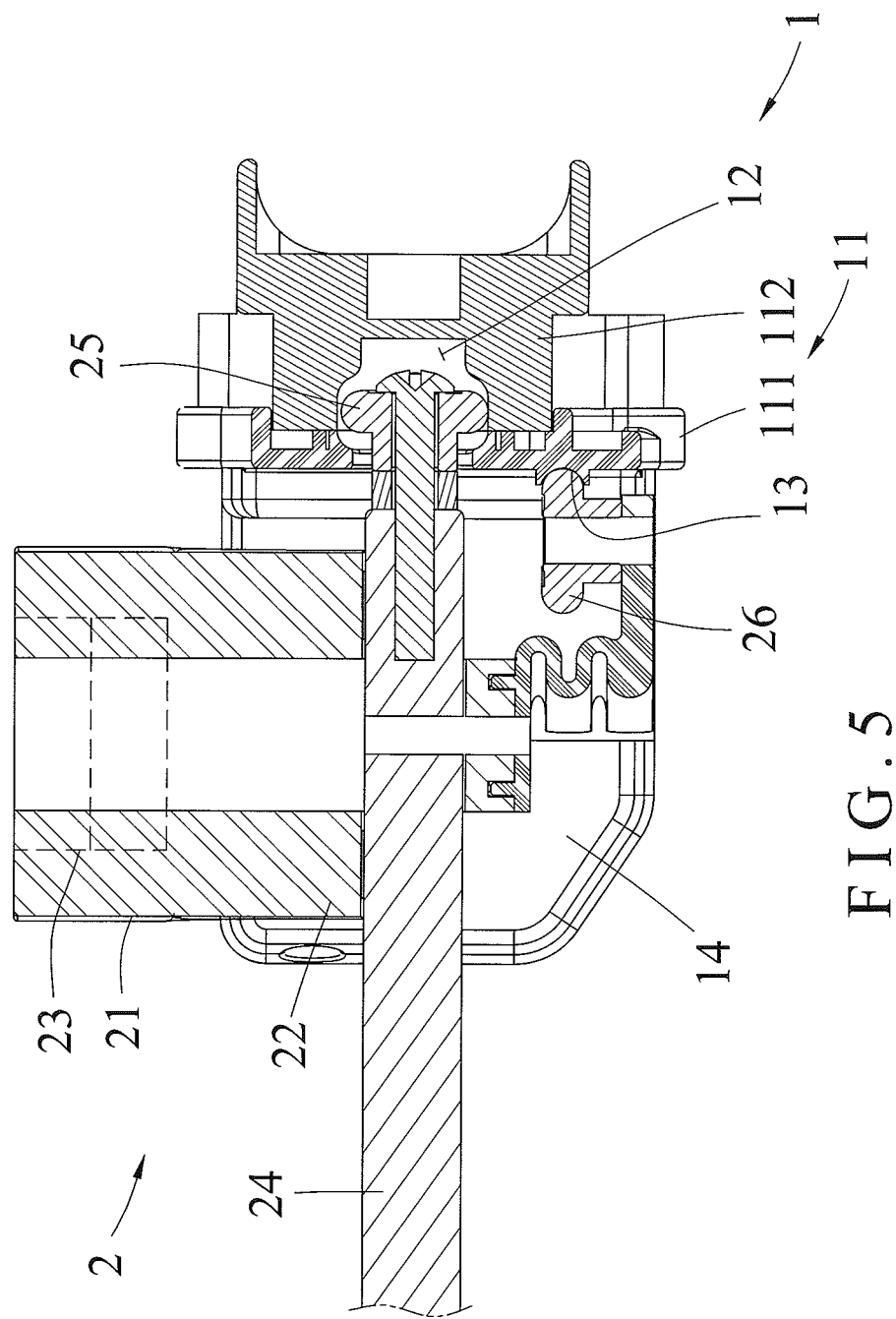
FIG. 5 is another cross-sectional assembly view of the electromagnetic cradle as shown in FIG. 2.
Figure 6:
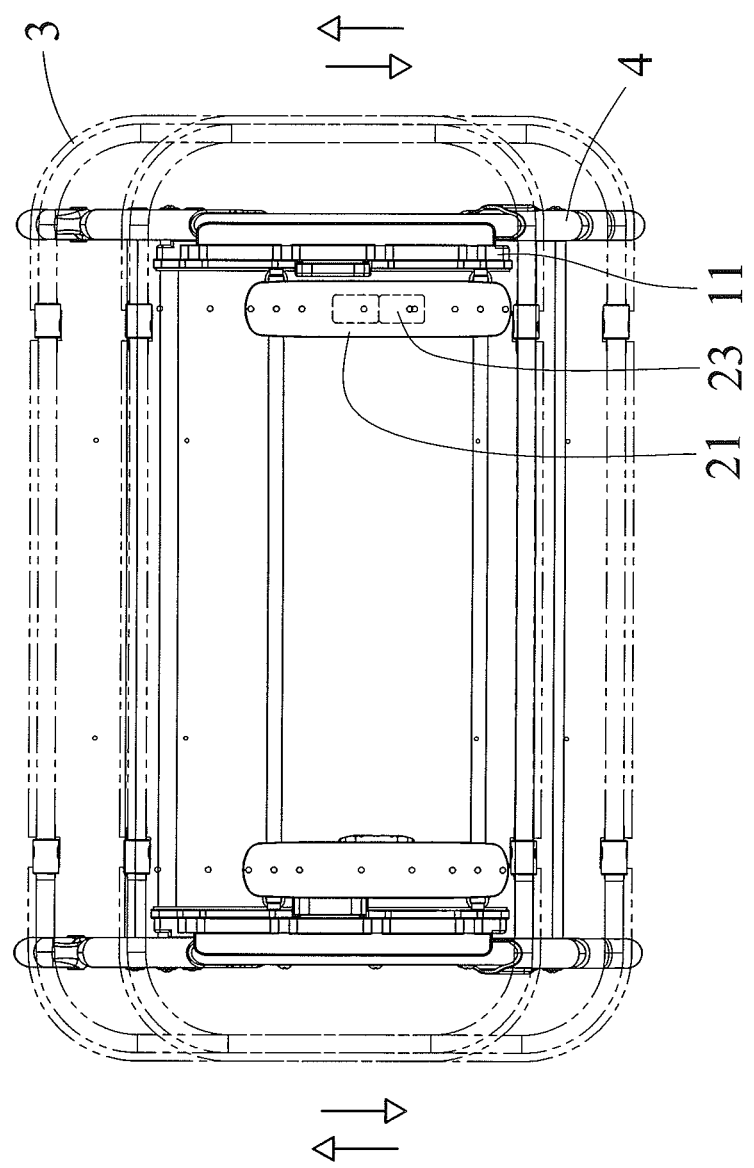
FIG. 6 is a schematic planar operational view of the electromagnetic cradle in accordance with the preferred embodiment of the present invention.
Figure 7:
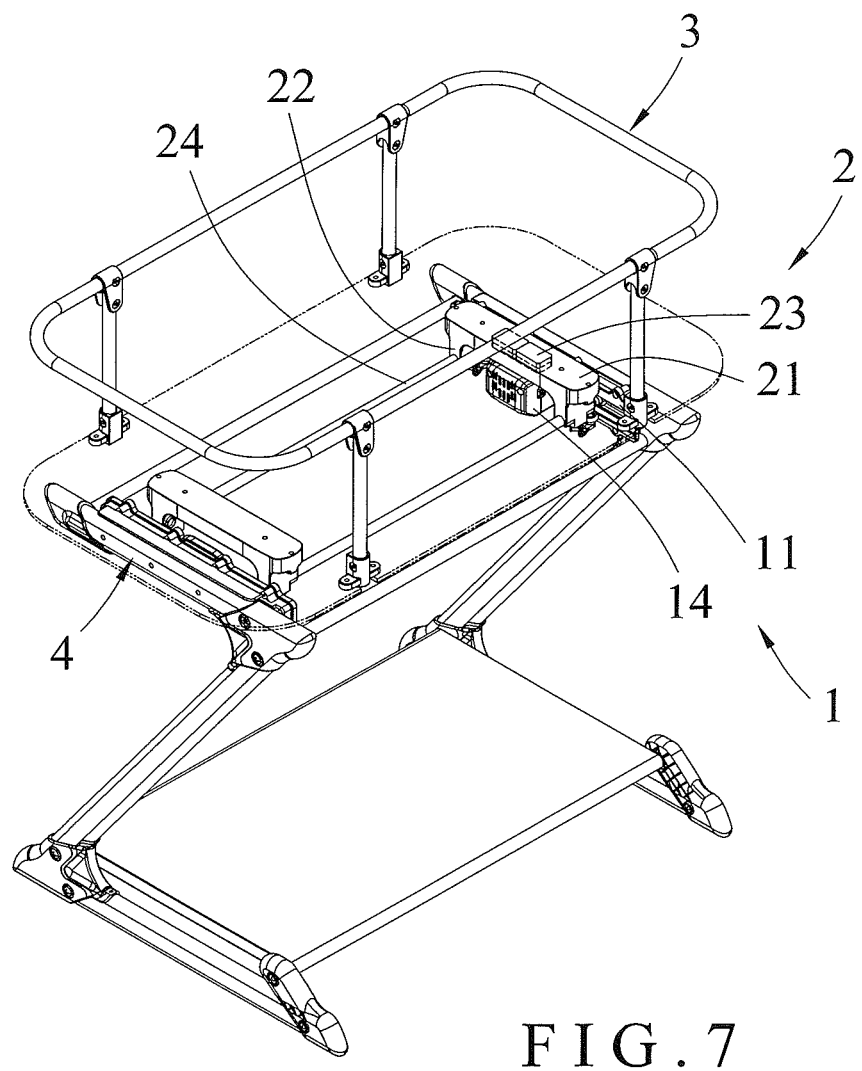
FIG. 7 is a perspective assembly view of the electromagnetic cradle in accordance with the preferred embodiment of the present invention.

In operation, referring to FIGS. 6 and 7 with reference to FIGS. 1-5, after the at least one electromagnetic device 14 is started, the at least one electromagnetic device 14 produces magnetism which repels or attract the magnet sets 23. At this time, the two tracks 11 of the track assembly 1 are secured on the bottom frame 4 so that the at least one electromagnetic device 14 is restricted and cannot be moved freely. In addition, the two linking rods 24 are movable between the two tracks 11 by the first rollers 25 and the second roller 26, so that the two slides 21 are slidable freely to move the rocking bed 3. Besides, the first slideways 12 and the second slideways 13 respectively restrict the moving direction of the first rollers 25 and the second roller 26. In such a manner, an external force is initially applied on the rocking bed 3, to move the two slides 21 relative to the two tracks 11, so that the magnet sets 23 are moved to pass the at least one electromagnetic device 14.

If the at least one electromagnetic device 14 repels the magnet sets 23, the magnet sets 23 are pushed by the at least one electromagnetic device 14 to drive and move the two slides 21 in the direction the same as that of the first slideway 12, so that the rocking bed 3 is moved in concert with the two slides 21. In such a manner, when the two slides 21 are moved in one direction relative to the at least one electromagnetic device 14, a first one of the at least two elastic members 27 is stretched, and a second one of the at least two elastic members 27 is compressed. Then, when the two slides 21 are moved through a determined distance, the two slides 21 are driven by the restoring force of the at least two elastic members 27 to move in the opposite direction. Thus, the at least two elastic members 27 efficiently control the even displacement interval of the two slides 21, to prevent the two slides 21 from being moved excessively or jammed at the innermost or outermost end due to a displacement unbalance. When the magnet sets 23 are moved to pass the at least one electromagnetic device 14 again, the at least one electromagnetic device 14 repels the magnet sets 23, and the magnet sets 23 are pushed by the at least one electromagnetic device 14 to drive and move the two slides 21 in the opposite direction. Thus, the rocking bed 3 is driven by the two slides 21 and moved reciprocally as shown in FIG. 6.

If the at least one electromagnetic device 14 attracts the magnet sets 23, the magnet sets 23 are pulled by the at least one electromagnetic device 14 to drive and move the two slides 21 in the direction the same as that of the first slideway 12, so that the rocking bed 3 is moved in concert with the two slides 21. In such a manner, when the two slides 21 are moved in one direction relative to the at least one electromagnetic device 14, a first one of the at least two elastic members 27 is stretched, and a second one of the at least two elastic members 27 is compressed. Then, when the two slides 21 are moved through a determined distance, the two slides 21 are driven by the restoring force of the at least two elastic members 27 to move in the opposite direction. When the magnet sets 23 are moved to pass the at least one electromagnetic device 14 again, the at least one electromagnetic device 14 attracts the magnet sets 23, and the magnet sets 23 are pulled by the at least one electromagnetic device 14 to drive and move the two slides 21 in the opposite direction. Thus, the rocking bed 3 is driven by the two slides 21 and moved reciprocally as shown in FIG. 6. In such a manner, the rocking bed 3 is moved reciprocally in an electromagnetic way.

As shown in FIG. 5, a gap is defined between the first roller 25 and the first slideway 12, so that the first roller 25 will deflect and vibrate during sliding movement. At this time, the first roller 25 is arranged in a vertical manner with a first angle, and the second roller 26 is arranged in a horizontal manner with a second angle different from the first angle of the first roller 25, so that the second roller 26 restricts and calibrates the sliding angle of the first roller 25. Thus, the rocking bed 3 is moved in the horizontal direction smoothly and steadily.

Figure 8:
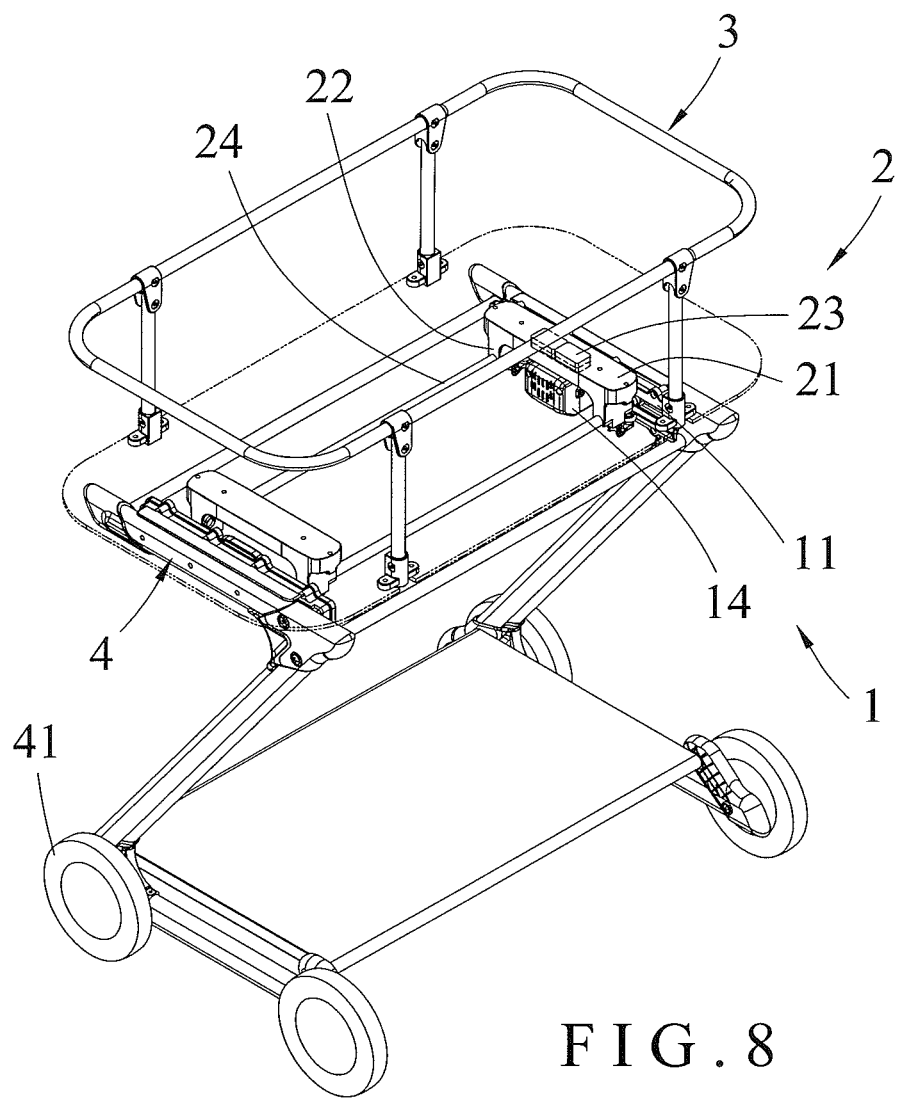
FIG. 8 is an exploded perspective view of an electromagnetic cradle in accordance with another preferred embodiment of the present invention.

Referring to FIG. 8, the bottom frame 4 is provided with a plurality of castors 41 to facilitate movement of the rocking bed 3.

Accordingly, the two tracks 11 of the track assembly 1 are compact and do not occupy a large space, thereby reducing the whole structural space of the electromagnetic cradle. In addition, the first roller 25 and the second roller 26 are arranged in two different angles to restrict and calibrate the sliding angle of the first roller 25, so that the rocking bed 3 is moved in the horizontal direction smoothly and steadily without producing vibration or sway. Further, the rocking bed 3 is moved conveniently by provision of the at least two elastic members 27.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. An electromagnetic cradle comprising:
a track assembly;
a sliding assembly mounted on the track assembly;
a rocking bed mounted on the sliding assembly; and
a bottom frame mounted on the track assembly;
wherein:
the track assembly includes two tracks, and at least one electromagnetic device selectively mounted on one of the two tracks;
each of the two tracks has an interior provided with a first slideway and an exterior provided with a second slideway;
the sliding assembly includes:
two linking rods each slidably mounted between the two tracks of the track assembly;
two slides each mounted on the two linking rods;
a plurality of magnet sets mounted on one of the two slides and aligning with the at least one electromagnetic device; and
at least two elastic members each biased between the one of the two slides and the at least one electromagnetic device;
each of the two linking rods has two distal ends each provided with a first roller slidably mounted in the first slideway of one of the two tracks and a second roller slidably mounted in the second slideway of one of the two tracks;
the first roller is arranged in a vertical manner;
the second roller is arranged in a horizontal manner;
each of the two slides is provided with two support arms each mounted on one of the two linking rods;
the rocking bed is mounted on and located above the two slides of the sliding assembly; and
the bottom frame is mounted on and located under the two tracks of the track assembly.

2. The electromagnetic cradle of claim 1, wherein each of the two tracks includes an inner rack and an outer rack combined together, and the first slideway is formed in the inner rack and the outer rack after combination of the inner rack and the outer rack.

3. The electromagnetic cradle of claim 2, wherein the bottom frame is mounted on the outer rack.

4. The electromagnetic cradle of claim 1, wherein:
the magnet sets are juxtaposed to each other and are directed in a direction the same as a path of the first slideway and the second slideway; and
each of the magnet sets includes two magnets overlapping each other.

5. The electromagnetic cradle of claim 1, wherein each of the at least two elastic members is located at an inner side of the one of the two slides and is biased between one of the two support arms and the at least one electromagnetic device.

6. The electromagnetic cradle of claim 1, wherein:
the one of the two slides is located above the at least one electromagnetic device;
each of the two support arms extends downward from a bottom of each of the two slides; and
each of the two support arms is located above on one of the two linking rods.

7. The electromagnetic cradle of claim 1, wherein the bottom frame is provided with a plurality of castors to facilitate movement of the rocking bed.

* * * * *